United States Patent [19]

Mitchell

[11] Patent Number: 4,493,151
[45] Date of Patent: Jan. 15, 1985

[54] APPARATUS FOR CUTTING VEGETATION

[75] Inventor: Albert W. Mitchell, Houston, Tex.

[73] Assignee: Emerson Electric Co., St. Louis, Mo.

[21] Appl. No.: 392,226

[22] Filed: Jun. 25, 1982

Related U.S. Application Data

[63] Continuation of Ser. No. 144,062, Apr. 28, 1980, abandoned.

[51] Int. Cl.³ .............................................. A01D 50/00
[52] U.S. Cl. .......................................... 30/276; 56/12.7
[58] Field of Search ............................ 30/276; 56/12.7

[56] References Cited

U.S. PATENT DOCUMENTS

| | | | |
|---|---|---|---|
| 4,104,796 | 8/1978 | Sheldon | 30/276 |
| 4,236,312 | 12/1980 | Foster et al. | 30/276 |
| 4,244,103 | 1/1981 | Snarr | 30/276 |
| 4,285,127 | 8/1981 | Zerrer et al. | 30/276 |
| 4,290,200 | 9/1981 | Lombard | 30/276 |
| 4,352,243 | 10/1982 | Lombard | 30/276 |

FOREIGN PATENT DOCUMENTS 2429550  1/1980  France .

Primary Examiner—Jimmy C. Peters
Attorney, Agent, or Firm—Hubbard, Thurman, Turner & Tucker

[57] ABSTRACT

Apparatus for cutting vegetation with a rotatable head carrying a non-metallic cutting line extended into a cutting plane. Additional line is extended from a supply line coil within the head into the cutting plane without independent operator action. A mechanism in the head automatically feeds replacement line whenever the free end of the cutting line is reduced to less than a predetermined maximum length in the cutting plane. The cutting line length is always extended to this predetermined maximum length at all operational rotational speeds, without adjustment, and in a positive step-by-step mode of segmental line advancement. The line feeder mechanism, has an escapement cam with an off center pivotal mounting that senses both centrifugal forces on the cutting line and changes in rotary speed of the head.

26 Claims, 8 Drawing Figures

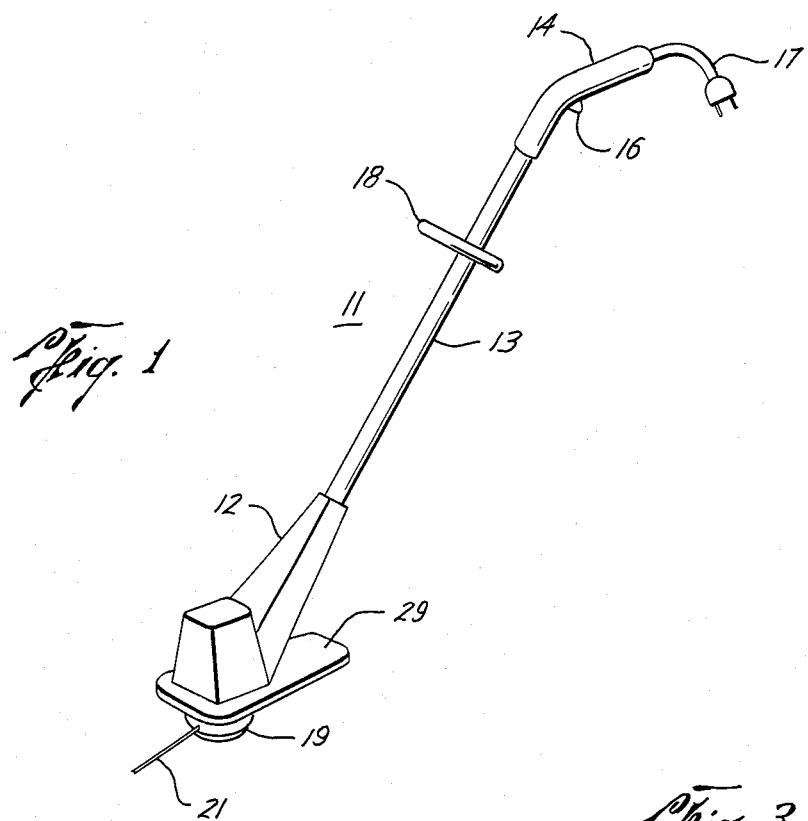
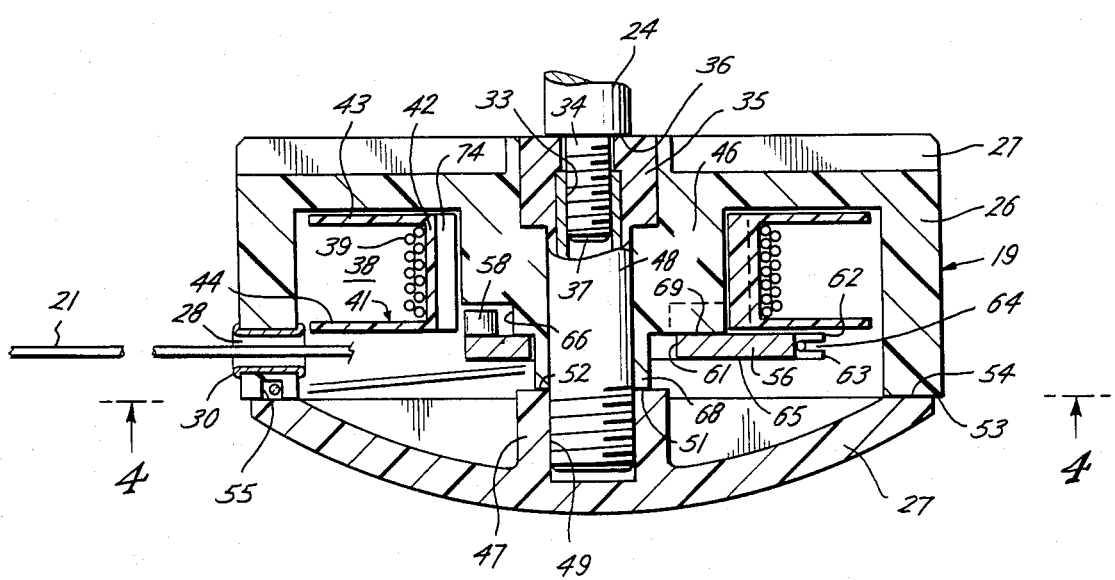

4,493,151

APPARATUS FOR CUTTING VEGETATION

This application is a continuation of application Ser. No. 144,062, filed: Apr. 28, 1980, now abandoned.

BACKGROUND OF THE INVENTION

1. Field of the Invention

This invention relates to the cutting of vegetation, and more particularly, it relates to the cutting of vegetation using a flexible, non-metallic cutting line extending from a rotating head into a cutting plane.

2. Description of Prior Art

Various types of devices have been proposed for many years to facilitate the removal of vegetation by mowing, trimming, edging and like cutting operations. In general, these devices have employed a metal blade to effect vegetation removal. Devices of this nature employ prime movers such as electric and gasoline motors. As a result, rotating metal blades can inflict serious and terrible injury upon the user.

In the United States of America, practical vegetation cutting devices using flexible, non-metallic lines carried upon a rotating head were developed. Examples of devices are shown in U.S. Pat. Nos. 3,708,967, 3,826,068, 4,052,789, 4,054,992, 4,067,108 and 4,104,797. These patented devices have met outstanding success in that these American developments provide safer electrical or gasoline-powered tools for vegetation cutting, edging and trimming operations.

The devices shown in these patents employ a flexible cutting line, such as manufactured from Nylon ® polymer. The cutting line is carried usually upon a spool internally of a rotating head. When desired to replenish the line or to extend an additional length of it, the rotation of the head was stopped and line manually extended from the spool. This line extension procedure in the patented devices has been found to be convenient, simple and reliable. In many of the more powerful devices, especially those powered by DC electric motors, a system to extend the cutting line from the head without interrupting cutting operations was desired.

A most desirable system would be capable of feeding cutting line as needed from the head so that line feeding is independent of operator action during grass cutting. Structures directed toward this purpose are shown in U.S. Pat. Nos. 3,895,440, 4,020,550 and 4,035,915. These structures have in common a basket-weave supply of cutting line carried on the periphery of a disc with the line feeding from behind special post members. These post members have a cutting-abrading edge so that cutting line from the weave supply is bent about such edge in the free traveling end portion extending into the cutting plane. The combination function of the edge, line, angular speed, etc., is arranged so that the line posts with such edge sever the free end of the cutting line when it is worn to an ineffective length. In practice, these structures are found to waste about 25 per cent of the cutting line because of the excessive length of line severed at the post's edge, e.g., three inches.

Other line feeding structures are shown in U.S. Pat. Nos. 4,118,864 and 4,138,810. These mechanisms control spool rotation in line feeding functions by worm and spur gears having complex action in the vegetation cutting environment.

The present invention provides a rotating head with a simple mechanism that maintains the cutting line at its maximum present length in the cutting plane irrespective of rates of cutting line wear or loss and without interrupting vegetation cutting or requiring independent operator action. However, the operator can selectively activate the mechanism if additional length of cutting line extensions are desired.

SUMMARY OF THE INVENTION

In accordance with this invention, there is provided an apparatus for cutting vegetation which has a head rotatable about an axis of rotation. The head may carry in a cavity a coiled supply of a flexible non-metallic cutting line. The cutting line extends outwardly from the head through an aperture into a cutting plane. An escapement cam in a first position secures the cutting line against extension from the head when its free end is at a predetermined maximum length. The escapement lever in a second position uncoils the cutting line for extending step-by-step the cutting line through the aperture into the cutting plane. Off center pivot means swing the escapement cam from the first position to the second position, during head rotation to extend the cutting line from the aperture whenever the cutting line is shortened to less than the predetermined maximum length during the cutting of vegetation.

DESCRIPTION OF THE DRAWINGS

FIG. 1 is a pictorial view illustrating one embodiment of the apparatus for cutting vegetation arranged according to the present invention;

FIG. 3, is a vertical-section, in enlargement, taken axially through the cutting head of the apparatus shown in FIG. 2;

In these drawings, the several embodiments have common elements of construction in the cutting head. In regard to the several figures, like elements carry like numerals to simplify description of these embodiments in description of the present apparatus.

DESCRIPTION OF PREFERRED EMBODIMENTS

Figure 2:
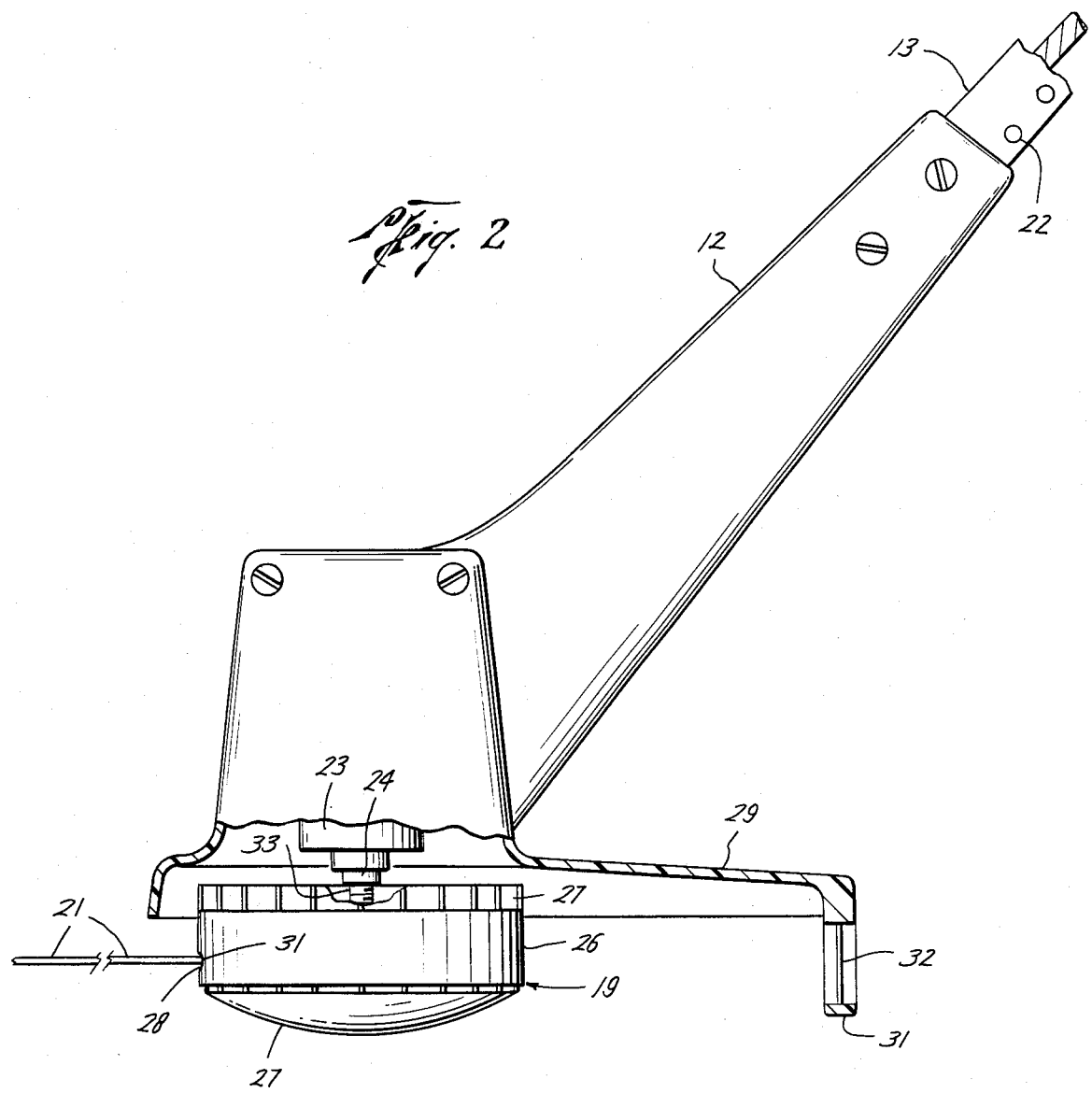
FIG. 2 illustrates in enlargement the lower portion of the apparatus shown in FIG. 1.
Figure 8:
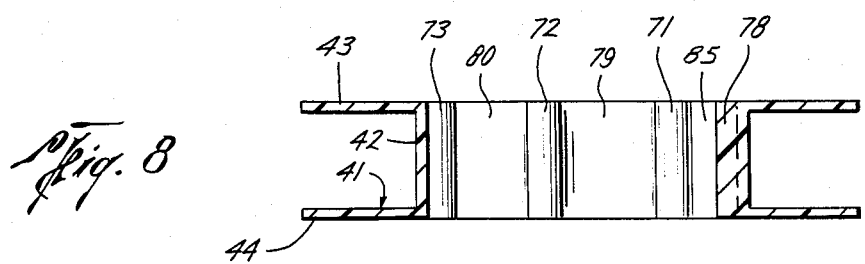
FIG. 8 is a cross-section of the spool used in the cutting head.
Figure 4:
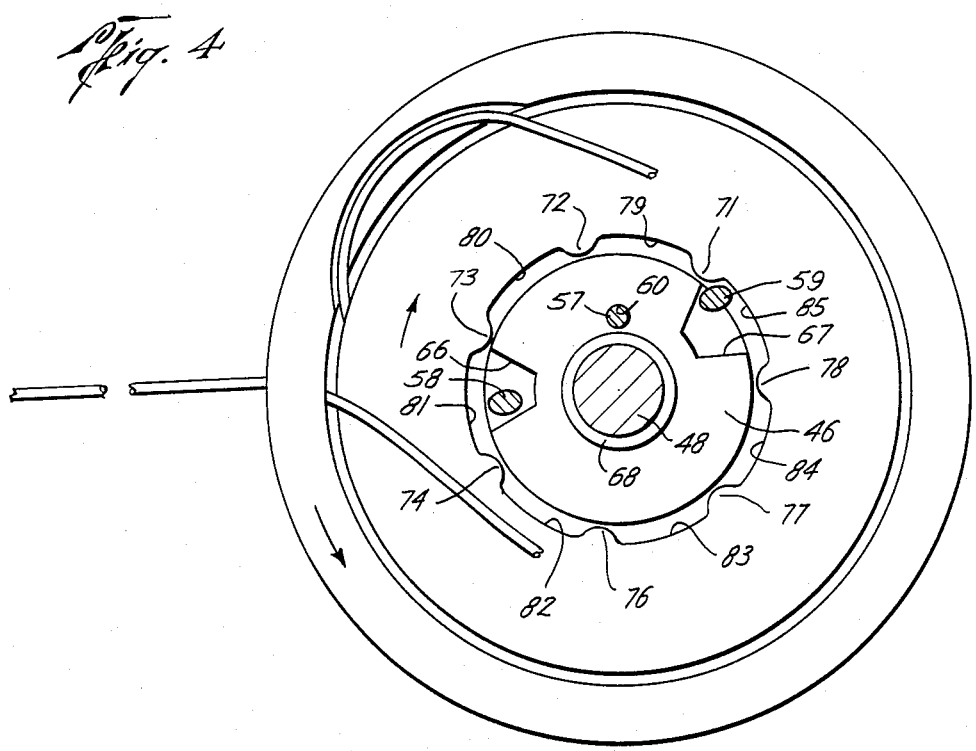
FIG. 4 is a cross-section of the cutting head as shown in FIG. 3, taken along line 4—4.
Figure 5:
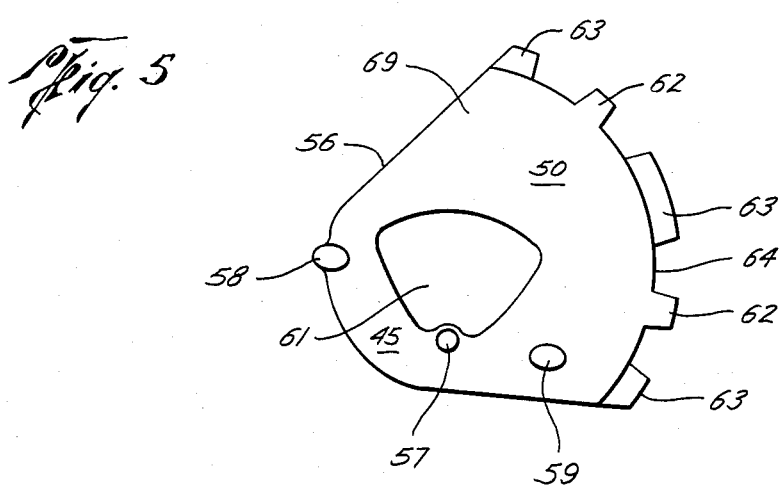
FIG. 5 is a top plan view of the escapement cam of the cutting head shown in FIG. 3.

Referring to FIG. 1, there is shown an apparatus for cutting vegetation which is constructed in accordance with one embodiment of the present invention. In this particular embodiment, the apparatus is a grass trimmer 11, but it could be a lawn mower, edger or other device for vegetation cutting purposes. The trimmer 11 has a lower housing 12 interconnected by a tube 13 to a handle assembly 14. The assembly 14 provides a switch 16 for selectively applying electrical power received by a cord 17 to an electrical motor carried within the housing 12. For two-handed operation of the trimmer 11, an auxiliary handle 18 is provided upon the tube 13. The lower housing 12 carries a head 19 rotatable about an axis passing through the housing 12, and the cutting line 21 extends into a cutting plane which is substantially perpendicular to the axis of rotation of the head.

In FIG. 2 there is shown an enlargement of the housing 12 carrying a plurality of air induction openings 22 in the tube 13. These openings introduce a flow of cooling air over the motor contained in the housing 12. The housing 12 includes an electric motor 23 which has a downwardly-extending drive shaft 24. The head 19 is threadedly connected to the shaft 24. The upper surface of the head 19 may be surrounded by a plurality of vanes 27 serving as a centrifugal blower for moving air radially outwardly from the head 19 during its rotation. As a result, the induced flow of air cools the motor 23 within the housing 12. The head 19 includes a hub 26 and a cover 27. The hub 26 carries in its side peripheral surface an aperture 28 through which the cutting line 21 extends radially outwardly into the cutting plane. A metal bearing surface 30 may be placed at the aperture to protect the line 21 against undue wear and breakages. The cover 27 is releasably secured to the hub 26 by a threaded connection.

The housing 12 includes a rearwardly-extending tail part 29 which serves as a protection to the user to prevent inadvertent contact with the rotating cutting line 21. Also, the tail part provides an automatic limit to any excessive extension of the cutting line 21 from the head 19. More particularly, the tail part 29 has a downwardly-extending projection 31 in which is embedded a metal cutting blade 32. As a result, the cutting line 21, when rotated in a cutting plane by the head 19, can never have an operating length greater than the distance from the axis of rotation to the cutting blade 32. Any greater length of cutting line is automatically severed by the blade 32.

The head 19, as seen in FIGS. 3–7, is disc-like with a smooth peripheral side surface carrying the aperture 28 through which the cutting line 21 extends into the cutting plane. If more than one cutting line is used, each line should have a separate aperture and bearing surface. The hub 26 one face carries an adapter 35 with an integral metal sleeve having interior threads 33 in which the drive shaft 24 is secured by its threads 34. In addition, the adapter threads 33 extends axially a sufficient dimension in the head 19 to form a rigid and integral connection with the shaft 24. Preferably, the shaft 24 is cylindrical with a flat circular shoulder 36 above its lower terminus 37.

The exposed external surfaces of the head 19 should be smooth in surface contour, rounded at the edges and without substantial projections and recesses capable of trapping appreciable vegetation. Preferably, the cover 27 has a smooth exposed surface, is circular in configuration with rounded corners, and is coaxially aligned with the axis of rotation of the head 19.

The hub 26 forms a cylindrical cavity 38 in cooperation with the cover 27. A supply 39 of coiled cutting line is disposed within the cavity 38. The coiled cutting line is free for uncoiling by independent rotational and axial movements within the head 19. Preferrably, the coiled cutting line is carried on a spool 41 mounted for rotation within the head.

The spool has a tubular body 42 with flanges 43 and 44 defining a space receiving the supply 39 of cutting line. The spool 41 is journaled for free rotation in the head 19 by its mounting upon a cylindrical post 46 and axially secured by a post 47 carried upon the hub 26 and cover 27, respectively.

The cover 27 carries internal threads 49 which receive the threaded stud 48 formed on the lower part of the adapter 35 in the hub 26. The hub and cover have meeting surfaces 51 and 52 provided by a reduced collar 68 on post 46 and the post 47, and peripheral abutting planar surfaces 53 and 54. The cover is unthreaded for access to the cavity 38, perferably counter-directionally to head rotation to prevent unintended loosening. A series of peripheral ridges permit ready gripping of the cover for its threaded mounting on the hub.

The interior end of the coiled cutting line is secured to the spool 41. The cutting line passes from the spool 41 in a helical path through an arcuate cut 55 in the hub 26, along the line control mechanism including an escapement cam 56 and then through the aperture 28. The free end of the cutting line 21 extends outwardly of the head 19 from the aperture 28. Preferably, the coiled cutting line supply 39 is wound codirectionally to the rotation of the head during vegetation cutting. This line winding arrangement avoids backlash problems and unintended uncoiling of cutting line when rotation of the head is suddenly induced.

In accordance with this invention, a fully automatic mechanism is provided to uncoil the cutting line within the head, and to extend the cutting line through the aperture into the cutting plane when the cutting line is shortened to less than the predetermined length.

More particularly, the mechanism provides for the positive segmental line advance by a controlled rotation of the spool 41 relative to the head 19 during vegetation cutting. An important feature of the mechanism is an escapement cam that provides a step-by-step rotation of the spool by sensing centrifugal force induced on the cutting line by head rotation and the force acting on the escapement cam resulting from changes in rotary speed at the head. Also, the escapement cam uses these forces in coaction to provide a snap-action line advancement function by mounting the escapement cam upon an off center pivot.

In reference to FIG. 3–7, an escapement cam mechanism is illustrated which provides the automatic but positive incremental extension, as needed, of the cutting line. The head 19 carries the escapement cam 56 in an off center pivot mounting which provides for swinging movement between a first position (shown in FIG. 6) and a second position (shown in FIG. 7).

The escapement cam 56 has a wedge-shape with an apex 45 at its small end and an enlarged portion 50 at its other end. The term wedge-shape is intended to include not only narrow angled members, but, also cams with included angles of 90 degrees or greater. Also, the enlarged portion preferably has a peripheral arcuate edge and good results are obtained with this edge being of a curve at the radius equal to the distance from the head's axis of rotation to the edge. However, the peripheral edge can have other configurations as will be apparent from the accompanying description.

The cam 56 has a central opening 61 which mounts about the neck 68 of the post 46. As a result, the cam mounts centrally within the head and swings between first and second positions upon an off center pivot relative to the post 46. More particularly, the cam 56 carries a pivot projection 57 adjacent its apex and the projection 57 is received loosely within a hole 60 in the post 46. Since the hole 60 is spaced from the axis head rotation, the cam 56 swings eccentrically between its first and second positions.

The cam 56 also carries projecting anchor pins 58 and 59 that are spaced to each side of the pivot projection 57. These anchor pins move radially inwardly and outwardly relative to recesses 66 and 67 formed into the end surfaces of the post 46.

Preferably, the cam 56 is planar and may be constructed of a rigid material of suitable strength, such as aluminum. The anchor pins can be cast or machined into the planar body of the cam and project normally from its top surface 69. Good results are provided where the anchor pins are round but preferably, the anchor pins are oval in cross-section for smooth operation.

The enlarged portion of the cam 56 has a peripheral edge with a longitudinal groove 64 to receive the cutting line 21 in that portion extending between the spool 41 and the aperture 28. The groove 64 may have unbroken edges, but preferably, as for weight savings, the groove 64 is provided by laterally offset projections 62 and 63 to contain the cutting line. The force arising from the cutting line extending from the rotating head 19 is applied through groove 64 (as on a pulley) to move the cam 56 sideways between the first and second positions.

The enlarged portion 50 of the cam 56 also provides adjacent the groove 64 of a counterbalance mass that provides a unique function in the present head. The mass of the cam 56 at its enlarged end 50 (without the cutting line acting upon it) is arranged to function with the off center pivot mounting on projection 57 so that at normal operating rotary speeds, the cam 56 is moved into the second position, wherein the cutting line is extended stepwise in a length from the rotating head 19.

The action of the cutting line in the groove 64 is to swing the cam 56 responsive to the centrifugal force acting upon the free end of the cutting line within the cutting plane.

When the cutting line 21 is at its predetermined maximum extended length into the cutting plane, the cam 56 is swung into its first position (FIG. 6) wherein the cutting line is secured against extension or feeding additional line from the head.

When the cutting line 21 is shortened to less than the desired predetermined maximum extended length, the effective centrifugal force of the cutting line is lessened, and the cam 56 swings into its second position (FIG. 7) and a length of cutting line is extended stepwise from the rotating head 19.

The cam 56 moves with a snap-action between the first and second positions, because of the off center pivotal mounting of the cam 56 relative to the rotational axis of the head 19, the counterbalance mass, and the action of the cutting line on the cam. This positive movement between positions insures a proper and positive feeding of cutting line from the head. At no time, can the cam oscillate or hunt between the first and second positions.

Any mechanism can connect the cam 56 with the spool 41 for controlling its rotation relative to the head 19 in a stepwise fashion. Preferably, a tooth and anchor pin arrangement is used. For this purpose, the spool 41 carries a plurality of radially inward facing teeth 71–74 and 76–78. These teeth at their inner ends provide bearihg surfaces about the post 46 for coaxial rotation of the spool 41 relative to the hub 26. Preferably, the teeth are axially elongated and extend the length of the tubular body 42 of the spool 41.

The teeth 71–74 and 76–78 are separated by grooves 79–85. These grooves are of sufficient depth to provide clearance to the anchor pins when in their radial outward positions. As a result, the spool rotates freely until a tooth encounters an anchor pin in its position outward from the recesses on the post 46.

The teeth are dimensioned to be engaged by the anchor pins 57 and 58 when either pin is in its outward position. Of course, these teeth are disengaged by either pin when in its inward position and received within recesses 66 and 67 on the post 46. One anchor pin engages a tooth while the other pin is in the recess on the post 46.

Figure 6:
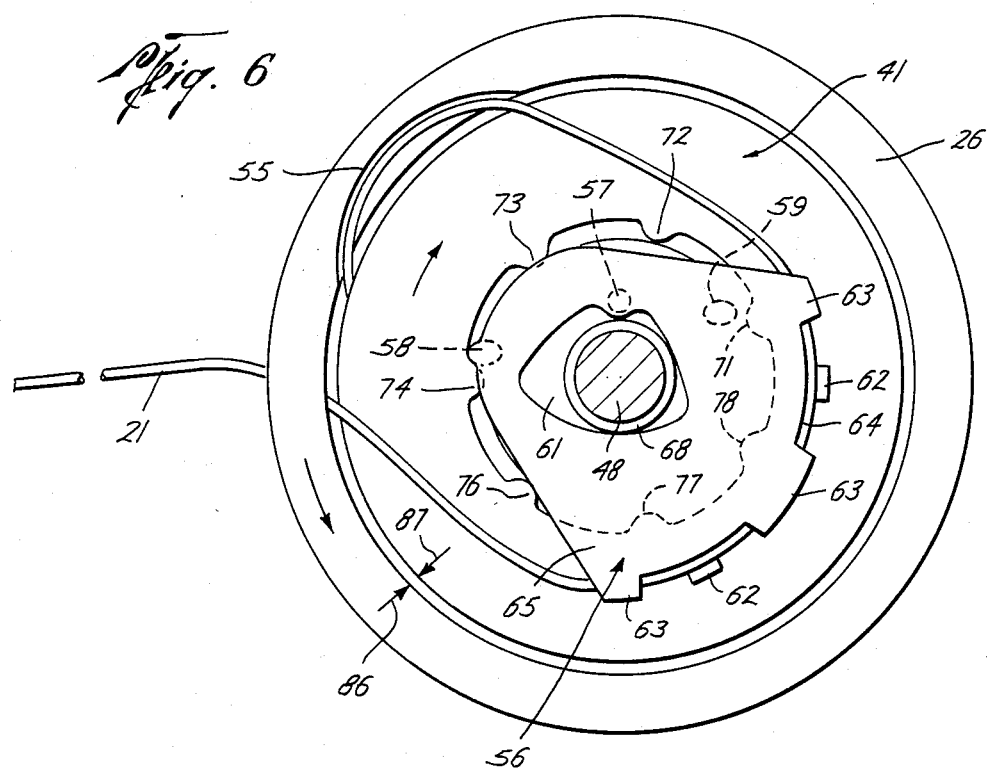
FIG. 6 is a cross-section taken on the same line as the view of FIG. 4 and illustrating the escapement cam in a first position to prevent rotation of the spool carrying cutting line within the cutting head.

The teeth and anchor pins are angularly positioned to cooperate as an escapement to control rotation of the spool 41 as the cam 56 is swung sideways between the first and second positions. Referring to FIG. 6, the cam 56 is in the first position, and the anchor pin 58 engages the tooth 74 to secure the spool 41 against rotation to feed the cutting line from the head 19. At this time, the anchor pin 59 is in the recess 67.

Figure 7:
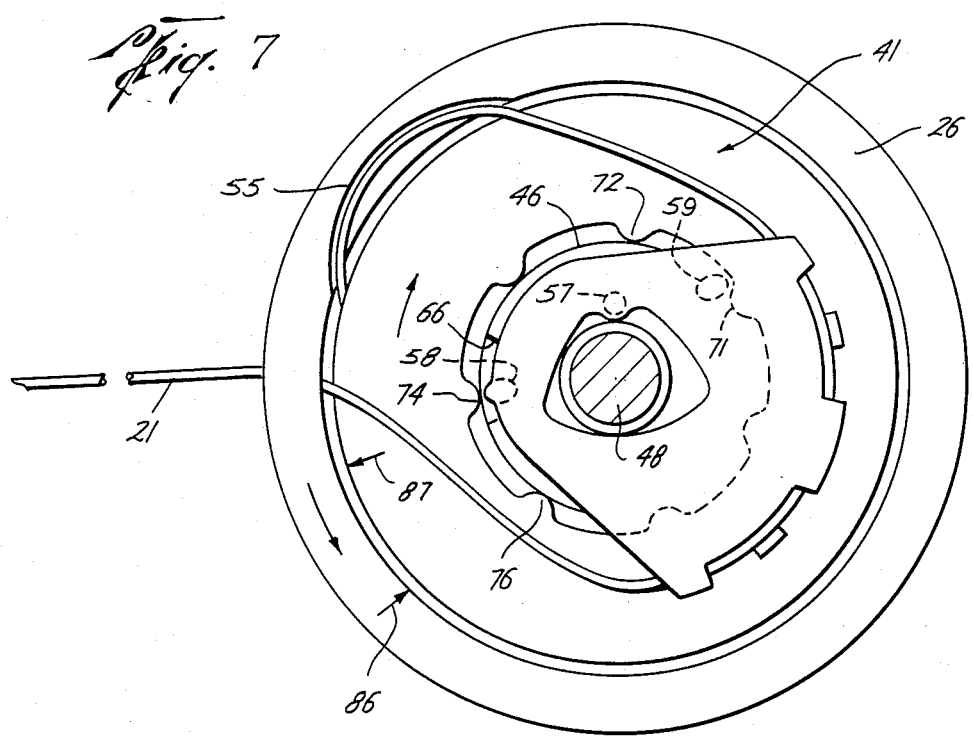
FIG. 7 is a cross-section like FIG. 6 but with the escapement cam in the second position to allow spool rotation to extend cutting line from the cutting head.

When the cutting line 21 is shortened to less than the predetermined maximum extended length in the cutting path, the cam 56 swings into the second position as seen in FIG. 7. The anchor pin 58 has moved into the recess 66 and the spool 41 is rotated angularly until the tooth 72 in its outward position engages the anchor pin 59.

The spool rotates step-wise until the outward anchor pin stops the next approaching tooth. If the cutting line 21 has now been extended to the desired extension into the cutting plane, the cam 56 now is swung into the first position. If the cutting line is yet not fully extended, from the head 19, the cam 56 swings toward the second position sufficiently to clear the anchor pin 58 from the adjacent tooth and returns momentarily into the first position, and the cam 56 again swings between first and second positions for feeding stepwise additional lengths of cutting line from the rotating head. At this time the spool has rotated angularly a certain displacement shown by the index arrows 86 and 87. This successive feeding function of the cam 56 is the product of the off center pivoted mountings in coordination with the selected counterbalance mass, and the swinging action of the cam from the centrifugal force applied to it by the extended cutting line.

The cam 56 with the counterbalance mass also has a unique function in that not only is automatic line feeding obtained without operator intervention, but additional line feed (if needed) is induced by a start-stop operation of the trimmer 11, or other certain changes in rotary speed of the head 19.

As the head 19 accelerates, the counterbalance mass reacts to swing the cam 56 into the second position, but when the cutting line is fully extended, the spool is not released for rotation becuase of the action of the cutting line on the cam. As the head 19 decelerates, the cam 56 is held in the first position so no feeding of the cutting line can occur. Thus, line feeding can be induced at shortened cutting line lengths by a start-stop operation of the trimmer, or by changes in the rotator speed of head 19 while cutting vegetation. However, the counterbalance mass at the enlarged end of the cam 56 must not be too great relative to action of the cutting line on the cam because the cam would shift into the second position and feed cutting line each time the head 19 accelerates in rotary speed.

The eccentric swinging of the cam 56 provides for the anchor pins to be jammed against the teeth they engage upon the spool. The anchor pins move radially outwardly and an arc intersecting the circle defining the teeth on the spool. As a result, the spool must move slightly counterdirectionally to the direction for unwinding cutting line to release the cam for movement between the first and second positions. This unique function of the offcenter pivoted cam prevents overfeeding or ratcheting (machine-gunning) of the cam relative to the spool.

The feeding of the cutting line appears to involve some sliding of its portion contained in the groove 64. Assuming that the centrifugal force acting on the free end of the cutting line holds taut that portion of the cutting line between the groove 64 and aperture 28, then the cam 56 swinging into the second position (FIG. 7) requires the cutting line to slide in the groove 64. Stated in a different matter, the cam 56 in swinging into the second position must let the cutting line slide in the groove 64. Otherwise, the cutting line would be pulled inwardly into the head at its free end within the cutting path.

The teeth 71-74 and 76-78 are separated by grooves 79-85. These grooves are of sufficient depth to provide clearance to the anchor pins when in their radial outward positions. As a result, the spool rotates freely until a tooth encounters an anchor pin in its position outward from the recesses on the post 46.

Although the head 19 can be manufactured in various forms and of several materials, it is preferred to manufacture the hub 26 and cover 27 of plastic material, e.g., Nylon 6 polymer. The spool 41 and cutting line can be made of a similar material. The cam 56 can be made of a durable strong material, such as steel, aluminum or various metallic combinations.

Although there has been described a particular arrangement of functions and elements in the various mechanisms employed in the head of the present invention, it is not intended that this description be the only possible arrangement of these elements to produce the results of the invention. In this regard, the functions and elements may be altered to produce the same results. All that is required for these elements is a mechanism which secures the line 21 from extension when at the predetermined maximum extended length in the cutting plane. Also, the mechanism must release the cutting line 'as needed' when the cutting line has been reduced by wear or loss, to length less than the desired maximum length. In addition, the mechanism provides for the automatic extension of the cutting line with a few relatively simple and inexpensive escapement elements.

From the foregoing, it will be apparent that there has been provided a novel apparatus for cutting vegetation which provides a novel apparatus for cutting vegetation which provides a convenient and safe means for extending automatically cutting line without the individual attention of the operator. It will be appreciated that certain changes or alterations in the present apparatus may be made without departing from the spirit of this invention. These changes are contemplated by and are within the scope of the appended claims which define the invention. Additionally, the present description is intended to be taken as an illustration of this invention.

What is claimed is:

1. An apparatus for cutting vegetation, comprising:
a rotatable head member,
at least one spool rotatably supported on said head member for rotation relative to said head member and having a coiled supply of cutting line wound about said spool;
guide means disposed on said head member for guiding an end portion of cutting line from said spool to the exterior of said head member whereby said end portion of said cutting line is extended from said head member by centrifugal force upon rotation of said head member;
means for rotatably driving said head member;
a control member engageable with a portion of said cutting line and movable between a first position and a second position on said head member and relative to said spool, said control member being engaged with said spool to restrain rotation of said spool relative to said head member while said control member is disposed in said first position and said second position and to release said spool for rotation relative to said head member while moving from said first position to said second position, thereby increasing the length of said end portion of said cutting line by a selected amount;
said control member being movable from said first position to said second position in response to a shortening of said end portion of said cutting line extending from said head member during rotation of said head member and being movable from said second position to said first position in response to an increase in length of said end portion of said cutting line extending from said head member and uncoiled from said spool during movement of said control member between said first and second positions.

2. An apparatus for cutting vegetation, comprising:
(a) a head rotatable about an axis of rotation and said head having at least one peripheral aperture;
(b) said head including means defining a cavity providing a storage area for cutting line;
(c) a supply of coiled cutting line disposed on rotatable means disposed on and rotatable relative to said head and in said cavity, and said cutting line being flexible and non-metallic with a free end extending outwardly from said head through said aperture into a cutting plane, said rotatable means being rotatable relative to said head to extend said cutting line through said aperture and into said cutting plane;
(d) an escapement cam including means cooperable with said rotatable means to provide engagement of said rotatable means with said escapement cam in a first position to prevent rotation of said rotatable means with respect to said head for securing said cutting line from extension through said aperture into the cutting plane when said free end has a predetermined maximum length;
(e) said escapement cam being movable on said head between said first position and a second position to permit rotation of said rotatable means with respect to said head for extending step-by-step said cutting line through said aperture into the cutting plane;
(f) said escapement cam having a wedge shape with off center pivot means at its apex for swinging said escapement cam from said first position to said second position during head rotation whenever said cutting line is shortened to less than the predetermined maximum length, whereby said cutting line is extended in length during the cutting of vegetation; and (g) said escapement cam includes an arcuate groove formed at an enlarged portion of said escapement cam to engage said cutting line adacent said aperture for sensing variations in centrifugal force exerted upon said free end of said cutting line reflecting the angular velocity of said head during rotation.

3. The apparatus of claim 2, wherein said cutting line acts on said escapement cam to shift angularly said escapement cam into the second position when said cutting line is shortened to less than the predetermined length.

4. The apparatus of claim 3, wherein said escapement cam includes a counterbalanced mass to move about said off center pivot means responsive to a decrease in centrifu-gal force for shifting said escapement cam into the second position.

5. The apparatus of claim 4, wherein said escapement cam acts with a snap-action during acceleration of said head to shift positively said escapement cam into said second position.

6. The apparatus of claim 5, wherein said escapement cam acts with a snap-action during deceleration of said head to shift positively said escapement cam into the first position when said cutting line is extended to the predetermined maximum lenth.

7. An apparatus for cutting vetation, comprising:
(a) a head rotatable about an axis of rotation and said head having at least one peripheral aperture;
(b) said head carrying a cavity providing a storage area for cutting line;
(c) spool means mounted in said cavity and journalled therein for rotation about the rotational axis of said head and carrying a plurality of angularly disposed escapement teeth;
(d) a supply of flexible non-metallic cutting line disposed in a coiled portion about said spool means with one end secured thereto and with a free end extending outwardly from said head through said aperture into a cutting plane;
(e) an escapement cam carrying anchor pin means and in a first position said anchor pin means securing said spool means against rotation in said head when said cutting line at said free end in said cutting plane has a predetermined maximum length;
(f) said escapement cam in a second position stepping said anchor pin means between said escapement teeth on said spool means for rotating said spool means and uncoiling said cutting line for extension from said head through said aperture into the cutting plane; and
(g) said escapement cam being mounted centrally in said head to swing about off center pivot means to said second position from said first position during head rotation whenever said cutting line is shortened to less than the predetermined maximum length, whereby said cutting line is extended in length during the cutting of vegetation.

8. The apparatus of claim 7, wherein said escapement cam has a wedge-shape with said pivot means at its apex and an arcuate groove at its enlarged portion to engage said cutting line adjacent said aperture for sensing variations in centrifugal force exerted upon said free end of said cutting line reflecting the angular velocity of said head during rotation.

9. The apparatus of claim 8, wherein said cutting line acts on said escapement cam to shift said escapement cam into the second position when said cutting line is shortened to less than the predetermined length.

10. The apparatus of claim 7, wherein said escapement cam has a counterbalance mass to move about off center pivot means responsive to a decrease in centrifugal force for shifting said escapement cam into the second position.

11. The apparatus of claim 9, wherein said escapement cam acts with a snap-action during acceleration of said head to shift positively said escapement cam into said second position.

12. The apparatus of claim 9, wherein said escapement cam acts with a snap-action during deceleration of said head to shift positively said escapement cam into the first position when said cutting line is at the predetermined maximum length.

13. An apparatus for cutting vegetation, comprising:
(a) a head rotatable about an axis of rotation and said head having a peripheral apérture;
(b) said head carrying an annular cavity to provide a storage area for a cutting line;
(c) spool means mounted in said cavity and journaled therein for rotation about the rotational axis of said head;
(d) a flexible non-metallic cutting line disposed in a coiled portion about said spool means with one end secured thereto and with a free end of said cutting line extending radially outwardly through said aperture into a cutting plane;
(e) a wedge-shaped escapement cam centrally carried by said head and mounted at its apex on off center pivot means for swinging angular movement between first and second positions, said cutting line engaged within an arcuate groove about the enlarged end of said escapment cam, and said escapement cam in the first position securing said spool means against rotation in said head and said escapement cam in the second position controlling rotation of said spool means in said head for extending cutting line for from said head into the cutting plane;
(f) said escapement cam including a counterbalance mass to swing same between said first position and said second position responsive to forces applied by said cutting line to the enlarged end of said escapement cam, and said counterbalance mass on said escapement cam responding to changes in rotary speed of said head to coact in moving said escapement cam between the first and second positions; and
(g) the forces from said cutting line acting on said escapement cam and the counterbalance mass responding to changes in rotary speed of said head cofunctioning to secure said spool means against rotation in said head by moving with a snap-action said escapement cam into the second position when said cutting line is shortened to less than its predetermined maximum length whereby cutting line is extended in length during the cutting of vegetation.

14. The apparatus of claim 13, wherein said escapement cam swings on said off center pivot means for movement angularly from the first position to the second position when said head is accelerated in rotation between non-rotation and operation in cutting vegetation.

15. An apparatus for cutting vegetation, comprising:

(a) a head rotatable about an axis of rotation and said head having a peripheral aperture;

(b) said head carrying an annular cavity to provide a storage area for a cutting line;

(c) spool means mounted in said cavity and journalled therein for rotation about the rotational axis of said head;

(d) a flexible non-metallic cutting line disposed in a coiled portion about said spool means with one end secured thereto and with a free end of said cutting line extending radially outwardly through said aperture into a cutting plane;

(e) a wedge-shaped escapement cam centrally carried by said head and mounted at its apex on off center pivot means for swinging angular movement between first and second positions, said escapement cam adjacent to and each side of said off center pivot means carrying anchor pins, and movement of said escapement cam between the first and second positions moves said anchor pins radially between inward and outward positions, and said spool means carrying a plurality of angularly disposed escapement teeth, said teeth selectively engaged by said anchor pins for securing said spool means against rotation with said escapement cam in the first position and controlling rotation of said spool means by step-by-step engagement of said teeth by said anchor pins with said escapement cam in the second position, said cutting line engaged within an arcuate groove about an enlarged end of said escapement cam, and said escapement cam in the first position securing said spool against rotation in said head, and said escapement cam in the second position controlling rotation of said spool means in said head for extending cutting line from said head into the cutting plane;

(f) said escapement cam including a counterbalance mass to swing said escapement cam between said first position and said second position responsive to forces applied by said cutting line to said enlarged end of said escapement cam, and said counterbalance mass on said escapement cam being responsive to changes in rotary speed of said head to coact in moving said escapement cam between the first and second positions; and (g) the forces from said cutting line acting on said escapement cam and the counterbalance mass responding to changes in rotary speed of said head cofunctioning to secure said spool means against rotation in said head by moving with a snap-action said escapement cam into the second position when said cutting line is shortened to less than its predetermined maximum length whereby cutting line is extended in length during the cutting of vegetation.

16. The apparatus of claim 15, wherein said escapement teeth are disposed on said spool at equally spaced radial positions with one tooth disengaged by one of said anchor pins at its inward position and another of said teeth engaged by the other said anchor pins at its outward position.

17. An apparatus for cutting vegetation, comprising:

(a) a head rotatable about an axis of rotation and said head having a peripheral aperture;

(b) said head carrying an annular cavity to provide a storage area for a cutting line;

(c) spool means mounted in said cavity and journaled therein for rotation about the rotational axis of said head and carrying a plurality of angularly disposed escapement teeth in groups at a first radial position and a second radial position, (d) a flexible non-metallic cutting line disposed in a coiled portion about said spool means with one end secured thereto and with a free end of said cutting line extending radially outwardly through said aperture into a cutting plane;

(e) a wedge-shaped escapement cam carried centrally in said head adjacent said aperture, and said cutting line threaded in a groove formed within the enlarged end of said escapement cam in that portion of said cutting line extending from said spool means to said aperture whereby centrifugal force exerted upon said cutting line is applied as a force to swing said escapement cam, and the apex end of said escapement cam carries anchor pins;

(f) off center pivot means mounting said escapement cam adjacent its apex end on said head and providing for swinging said escapement cam between first and second positions in a plane transverse to the rotational axis of said head;

(g) said escapement cam including a counterbalance mass actuated by changes in rotary speed of said head to coact in moving said escapement cam between the first and second positions;

(h) said escapement cam swinging between the first and second positions simultaneously moving said anchor pins thereon between inward and outward radial positions;

(i) one of said anchor pins on said escapement cam in the first position selectively engaging one of said escapement teeth at the inward radial position to secure said spool means against rotation in said head, and the other one of said anchor pins disengaging another of said escapement teeth at the outward radial position to permit controlled step-by-step rotation of said spool means in said head for extending a length of cutting line from said aperture into the cutting path during head rotation; and (j) the centrifugal force of said cutting line acting to move said escapement cam and the counterbalance mass of said escapement cam responding to changes in rotary speed of said head cofunction to secure said spool means against rotation by moving with a snap-action said escapement cam into the first position when said cutting line is at its predetermined length and to permit controlled step-by-step rotation of said spool means by moving said escapement cam with a snap-action into the second position when said cutting line is shortened to less than its predetermined maximum length during the cutting of vegetation.

18. An apparatus for cutting vegetation, comprising:

a head rotatable about an axis of rotation, said head carrying a cavity providing a storage area for cutting line;

a supply of coiled cutting line disposed on rotatable means in said cavity, said cutting line being flexible with a free end extending outwardly from said head into a cutting plane;

an escapement member on said head movable relative to said head and said rotatable means between first and second positions, said escapement member including means to provide locking engagement with said rotatable means in said first position and said second position of said escapement member to prevent rotation of said rotatable means relative to said head;

said rotatable means being operable to rotate relative to said head to extend incremental lengths of cutting line into said cutting plane when said escapement member is moving between said first position and said second position;

said escapement member being movable from said first position to said second position during head rotation whenever said cutting line is shortened to less than the predetermined maximum length, whereby said cutting line is extended in length during the cutting of vegetation; and said escapement member being urged toward said first position due to a force exerted on said escapement member by said cutting line tending to extend into said cutting plane.

19. The apparatus set forth in claim 18 wherein:
said escapement member includes a surface engaged with a portion of said cutting line between said free end and a coiled portion of said cutting line on said rotatable means.

20. The apparatus set forth in claim 19 wherein:
said escapement member is mounted on said head in such a way as to be responsive to increased speed of rotation of said head to move to said second position.

21. The apparatus set forth in claim 20 wherein:
the mass of said escapement member and the configuration of said surface are predetermined to provide for successive feeding of incremental lengths of said cutting line into said cutting plane until a predetermined speed of rotation of said head and a predetermined force tending to extend said line into said cutting plane are reached, respectively.

22. An apparatus for cutting vegetation, comprising:
a head rotatable about an axis of rotation, said head carrying a cavity providing a storage area for cutting line;
a supply of coiled cutting line disposed on a rotatable spool in said cavity, said cutting line being flexible with a free end extending outwardly from said head into a cutting plane;
an escapement member on said head movable between first and second positions, said escapement member including spaced apart anchor means engageable with respective ones of circumferentially spaced apart teeth on said spool to provide locking engagement of said spool with said escapement member in said first position and said second position of said escapement member to prevent rotation of said spool relative to said head;
said pool being operable to rotate relative to said head to extend incremental lengths of cutting line into said cutting plane when said escapement member is moving between said first position and said second position;
said escapement member being movable from said first position to said second position during head rotation whenever said cutting line is shortened to less than the predetermined maximum length, whereby said cutting line is extended in length during the cutting of vegetation; and
said escapement member being urged toward said first position due to a force exerted on said escapement member by said cutting line tending to extend into said cutting plane.

23. The apparatus set forth in claim 22 wherein:
said teeth and said anchor means are of a configuration such that said escapement member, in moving from one position to another, causes said anchor means to urge said spool to rotate slightly in a direction opposite to that which will uncoil said cutting line from said spool prior to disengagement of a tooth from said anchor means.

24. An apparatus for cutting vegetation, comprising:
a head rotatable about an axis of rotation, said head having at least one peripheral aperture;
said head carrying a cavity providing a storage area for cutting line;
rotatable means disposed in said cavity and carrying a supply of flexible coiled cutting line, said rotatable means being rotatable relative to said head to uncoil said cutting line for extension of a free end of said cutting line outwardly from said head through said aperture into a cutting plane;
escapement means pivotally mounted on said head and engageable with said rotatable means in at least a first position of said escapement means to prevent rotation of said rotatable means relative to said head to uncoil said cutting line, said escapement means being movable relative to said rotatable means between said first position and a second position to release said rotatable means for limited rotation relative to said head for uncoiling incremental lengths of cutting line from said rotatable means for extension into said cutting plane;
said escapement means being engageable with a portion of said cutting line and responsive to a force tending to extend said cutting line into said cutting plane to be urged in said first position, said escapement means being responsive to shortening of said cutting line at said free end to less than a predetermined length during rotation of said head to move to said second position to effect release of said rotatable means for limited rotation relative to said head to feed an incremental length of cutting line from said rotation means for extension into said cutting plane.

25. An apparatus for cutting vegetation, comprising:
(a) a head rotatable about an axis of rotation and said head having at least one peripheral aperture;
(b) said head including means defining a cavity providing a storage are for cutting line;
(c) a supply of coiled cutting line disposed on rotatable means disposed on and rotatable relative to said head and in said cavity, and said cutting line being flexible and non-metallic with a free end extending outwardly from said head through said aperture into a cutting plane, said rotatable means being rotative relative to said head to extend said cutting line through said aperture and into said cutting plane;
(d) an escapement cam including means engaged with said rotatable means in an first position and a second position of said escapement cam with respect to said rotatable means to prevent rotation of said rotatable means with respect to said head for securing said cutting line from extension through said aperture into the cutting plane when said free end has a predetermined maximum length;
(e) said escapement cam being movable on said head between said first position and said second position to permit rotation of said rotatable means with respect to said head during movement of said escapement cam between said positions for extending step-by-step said cutting line through said aperture into the cutting plane; and (f) off center pivot means for swinging said escapement cam from said first position to said second position during head rotation whenever said cutting line is shortened to less than the predetermined maximum length, whereby said cutting line is extended in length during the cutting of vegetation.

26. An apparatus for cutting vegetation, comprising:

a head rotatable about an axis of rotation, said head carrying a cavity providing a storage area for cutting line;

a supply of coiled cutting line disposed on rotatable means in said cavity and rotatable relative to said head, said cutting line being flexible with a free end extending outwardly from said head into a cutting plane;

an escapement member on said head movable relative to said head and said rotatable means between first and second positions, said escapement member including means engageable with said rotatable means to provide locking engagement of said rotatable means with said escapement member in said first position and said second position of said escapement member to prevent rotation of said rotatable means relative to said head;

said escapement member includes a surface engaged with a portion of said cutting line between said free end and a coiled portion of said cutting line on said rotatable means;

means formed stationary with respect to said head and forming an arcuate recess for receiving a portion of said cutting line; and said cutting line is trained through said recess between said portion of said cutting line engaged with said surface on said escapement member and said coiled portion.

* * * * *